Feb. 14, 1956  H. J. WHITE  2,735,022

REVERSING CIRCUIT FOR POST-PULSE MODULATOR CHARGE

Filed Nov. 26, 1945

INVENTOR
HARRY J. WHITE

United States Patent Office 2,735,022
Patented Feb. 14, 1956

2,735,022
REVERSING CIRCUIT FOR POST-PULSE MODULATOR CHARGE

Harry J. White, Cambridge, Mass., assignor, by mesne assignments, to the United States of America as represented by the Secretary of the Navy Application November 26, 1945, Serial No. 630,941

6 Claims. (Cl. 307—108)

This invention relates to direct current resonant charging line type modulators and more particularly to a shunt circuit for reversing the post-pulse charge on a pulse forming network thereof.

The conventional line type modulator discharges the storage capacitor of the pulse forming network, hereinafter referred to as PFN, through an output-pulse transformer coupled to a nonlinear vacuum tube oscillator. A particular difficulty arises when the discharge circuit includes a unidirectional switch and a slight mismatch exists between the pulse-forming network and the load. This can result in a small reversed voltage appearing as an inverse charge across the network after the pulse. This small reversed voltage is in series with the charging source at the start of the next ensuing charging period. Hence, the total voltage available to produce the charging oscillation is increased and the voltage stored on the network for the next pulse is greater than the first value. The next discharge leaves a greater magnitude inverse charge on the network for two reasons: one, it occurs from an increased voltage level and therefore would produce a greater final voltage even if the load were linear; two, because of the non-linear nature of the vacuum tube oscillator load, the increased voltage increases the degree of mismatch between the network and its load. After several cycles of operation with successively greater values of stored and residual voltages, excessive voltages can result.

The present invention provides a means to reverse and conserve such a negative charge.

An object of this invention is to provide a circuit for reversing rapidly a post-pulse inverse charge on a pulse forming network.

Another object is to provide a method for reversing a post-pulse inverse charge on a pulse forming network.

Another object is to minimize power supply drain by reversing and conserving a post-pulse inverse charge on a pulse forming network.

These and other objects and features of this invention will become apparent upon consideration of the following detailed description when taken together with the accompanying drawings, the figures of which illustrate a typical embodiment of this invention.

Figure 1:
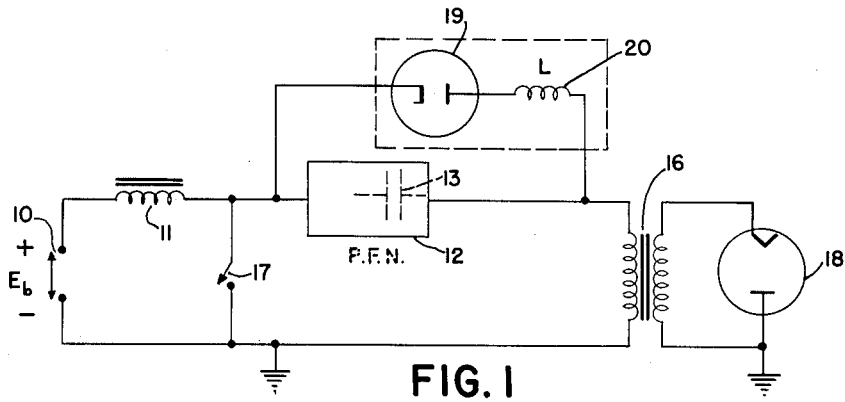
Fig. 1 illustrates a line type modulator circuit using a unidirectional switch and having a shunt circuit for the PFN.

In Fig. 1, a source of D. C. power 10 of potential $E_b$ is in a series loop with the charging choke 11, PFN12 and the primary of pulse transformer 16. This provides D. C. resonance charging of PFN12. PFN12 is illustrated as including a storage capacitor 13. Switch 17, when closed, grounds the positively charged side of PFN12 where it connects to charging choke 11. The PFN12 is thus discharged through the primary of transformer 16 to which is reflected the load of the diode oscillator 18 which is connected in series with the secondary of transformer 16. Across the PFN12, there is shunted in series the diode 19 and the inductor 20. The cathode of 19 connects to the junction of choke 11 and PFN12 so that the shunt circuit passes no current in the forward charging direction of the PFN12.

Figure 2:
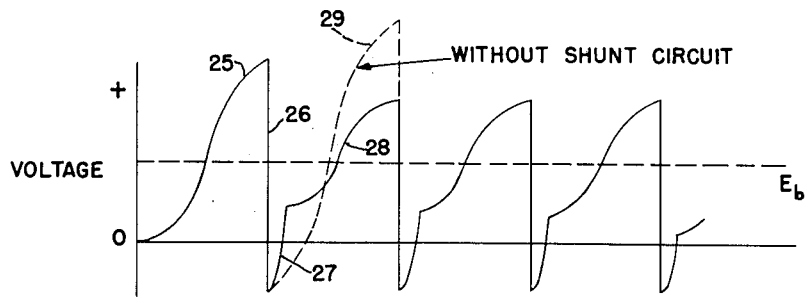
Fig. 2 illustrates the wave form of the voltage across the PFN.

In Fig. 2, wave form 25 depicts the normal charging of PFN12 from an initial zero charge. The peak reached is approximately $2E_b$ or twice the voltage of source 10. At the closing of switch 17, the modulator is pulsed and the voltage on PFN12 drops sharply towards zero as shown by the wave edge 26 and goes negative because of the inverse charge placed on PFN12 by the pulse transformer 16. Now switch 17 opens. When a negative charge appears on PFN12, the plate of diode 19 is positive with respect to the cathode and conduction begins. This places the inductor 20, and the storage capacitor 13 in a loop circuit and a resonant circuit is formed. The period of this circuit is large compared to the pulse duration but short compared to the interpulse charging period so that the resonant circuit again reverses the voltage on PFN12 as shown in the wave form section 27. The next cycle of charging of the PFN12 begins with its origin in a positive voltage region so that during the next cycle the PFN12 is charged to a correspondingly lower voltage as shown in 28. Within a few cycles the modulator settles down to a stable condition of repeating transients.

Without the shunting circuit, the voltage on PFN12 would remain in the negative region longer so that the charging voltage would build up to a value greater than normal as shown in dotted wave 29. Aside from the undesirable consequences of excessive voltage, the greater charging of the PFN12 involves greater current drain on the power supply. Some energy loss is encountered in the effective resistance of the shunt diode 19 and the inductor 20 and the effect of this loss is to limit the amplitude of the reversing swing 27 of the voltage of the PFN12 into the positive region.

Figure 3:
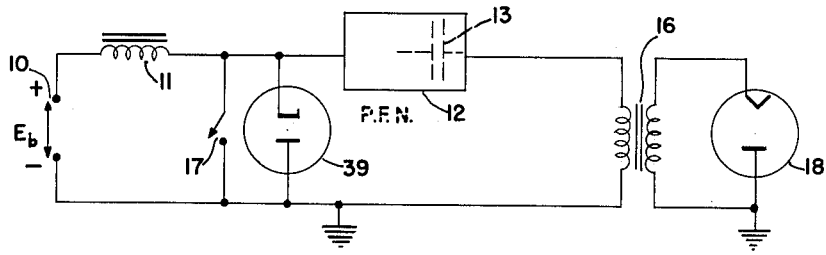
Fig. 3 illustrates a line type modulator circuit having a shunt circuit of an alternate form.

Fig. 3 has the same modulator circuit as Fig. 1. However, the shunting circuit consists simply of the diode 39 whose plate connects to ground and whose cathode connects to the junction of the charging choke 11 and the PFN12. Thus the diode 39 is a high resistance on forward charging of the PFN12 and conducts on reverse charging to prevent accumulation of a post-pulse inverse charge on the PFN12. This is the obvious way, well known in the art, to employ a rectifier to isolate a circuit from the flow of current in the reverse direction. The simple diode, of course, lacks the timing and control features of the shunt circuit illustrated in Fig. 1.

Although there is shown and described only a certain specific embodiment of this invention as applied to improvement of line type modulators, the many modifications possible thereof will be readily apparent to those familiar with the art. Therefore this invention is not to be limited except insofar as is necessitated by the prior art and the spirit of the appended claims.

What is claimed is:

1. In a line type modulator including a pulse forming network having a storage capacitor, a diode and an inductor in series shunted across said network, said diode being so connected as to conduct upon post-pulse inverse charging of said network, and said inductance being of such value as to resonate with said capacitor at such a period as to reverse said post-pulse inverse charge on said network in a time which is short relative to the charging period of said modulator and is long relative to the duration of the pulse.

2. In a line type modulator including a capacitor for pulse storage, a rectifier and an inductor in series connected across said capacitor, said rectifier being so connected as to shunt from said capacitor post-pulse inverse charges, and said inductor being of such value as to resonate with said capacitor at such a period that said post-pulse inverse charge is reversed in a short period relative to the charging period of said capacitor and in a long period relative to the duration of the pulse.

3. In a pulse modulating system, a pulse forming network, a direct current charging source for said network, means shunting said network and connected for conduction upon post-pulse inverse charging of said network, said means during conduction therethrough resonating said network to reverse said inverse charge to the same polarity as said charging source.

4. Apparatus for regulating the voltage of a pulse modulator system in the presence of post-pulse inverse charges on the pulse forming network, including means to shunt said inverse charges around said network through an inductive circuit resonant with said network to reverse the polarity of said inverse charges in the resonant loop so formed, said resonant loop having a period shorter than the interpulse charging period of said network thereby limiting the amplitude of charge.

5. Apparatus for regulating the voltage of a pulse modulation system in the presence of post-pulse inverse charges on the storage capacitor of a pulse forming network including an inductive circuit and means to connect said inductive circuit in shunt with said network upon post-pulse inverse charging of said network, said inductive circuit forming a resonant loop with said capacitor whereby the polarity of said inverse charges is reversed.

6. In a line type modulator including a capacitor for pulse storage, a rectifier and an inductor in series connected to shunt said capacitor, said rectifier being so connected as to shunt post-pulse inverse charges from said capacitor, said inductor forming with said capacitor a resonant circuit to reverse the polarity of said post-pulse inverse charges.

References Cited in the file of this patent

UNITED STATES PATENTS

| | | |
|---|---|---|
| 2,390,659 | Morrison | Dec. 11, 1945 |
| 2,429,471 | Lord | Oct. 21, 1947 |
| 2,459,858 | Westcott | Jan. 25, 1949 |
| 2,474,243 | Greenwald | June 28, 1949 |